United States Patent
Glock et al.

(10) Patent No.: US 6,564,914 B1
(45) Date of Patent: May 20, 2003

(54) HYDRODYNAMIC COUPLING DEVICE

(75) Inventors: Wilfried Glock, Dittelbrunn (DE); Rüdiger Hinkel, Röthlein (DE); Christoph Sasse, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/666,915

(22) Filed: Sep. 21, 2000

(30) Foreign Application Priority Data

Sep. 21, 1999 (DE) .......................... 199 45 201

(51) Int. Cl.[7] .................. F16H 41/00; F16H 45/02
(52) U.S. Cl. ................. 192/3.29; 60/330; 29/469
(58) Field of Search ................. 192/3.21, 3.25, 192/3.26, 3.27, 3.28, 3.29, 3.3, 3.33; 74/730.1, 732.1; 60/330; 29/889.5, 469

(56) References Cited
U.S. PATENT DOCUMENTS 2,295,887 A * 9/1942 Bixby et al. ............ 192/3.28
3,696,896 A * 10/1972 Hamilton, III ........... 192/3.28
3,745,643 A * 7/1973 Hause .................... 29/510
4,887,344 A * 12/1989 Kurihara et al. .......... 29/468
5,400,884 A * 3/1995 Matsuoka ................ 192/3.25

* cited by examiner

*Primary Examiner*—Richard M. Lorence
(74) *Attorney, Agent, or Firm*—Cohen, Pontani, Lieberman & Pavane

(57) ABSTRACT

A hydrodynamic coupling device for producing a torque transmission connection between a drive unit and a transmission is provided including a first coupling device attached to the drive unit for coupling the hydrodynamic coupling device with the drive unit for transmitting a torque between the hydrodynamic coupling device and the drive unit and a second coupling device attached to the transmission for coupling the hydrodynamic coupling device with the transmission for transmitting a driving and/or braking torque between the hydrodynamic coupling device and the transmission. A method of making a hydrodynamic coupling device is also provided.

23 Claims, 7 Drawing Sheets

HYDRODYNAMIC COUPLING DEVICE

BACKGROUND OF THE INVENTION

1. Field of the Invention

The present invention relates to a hydrodynamic coupling device for forming a torque transmission connection between a drive unit and a transmission, the coupling device having a first coupling area in which the hydrodynamic coupling device is couplable or coupled to the drive unit in a torque-transmitting manner and a second coupling area in which the hydrodynamic coupling device is couplable or is coupled to the transmission in a torque-transmitting manner. The present invention also relates to a method of making a hydrodynamic coupling device.

2. Description of the Related Art

Hydrodynamic coupling devices used in drivetrains in motor vehicles for hydrodynamic torque converters are principally constructed to be relatively extensively integrated in the transmission with respect to function and mechanical subassemblies. Usually, when constructing drivetrains, a hydrodynamic coupling device of this type is usually first combined with the transmission to form a subassembly. Then, the subassembly is added to and combined with a drive unit already installed on the chassis. Joining the subassembly of the coupling device and transmission to the drive unit is a relatively difficult undertaking because the installation space available between the hydrodynamic coupling device and the drive unit is very limited. In addition, assembly must be performed in a highly precise manner in order to minimize axial offsets or inclinations between a drive shaft of the drive unit and a driven shaft of the coupling device.

SUMMARY OF THE INVENTION

It is the object of the present invention to provide a hydrodynamic coupling device which simplifies the process of assembling the entire drive system.

This object is achieved by the present invention by a hydrodynamic coupling device for producing a torque transmission connection between a drive unit and a transmission, having a first coupling area in which the hydrodynamic coupling device is couplable or coupled to the drive unit in a torque-transmitting manner and a second coupling area in which the hydrodynamic coupling device is couplable or coupled to the transmission in a torque-transmitting manner. The hydrodynamic coupling device is coupled to the transmission in the second coupling area only for transmitting a driving/braking torque between the drive unit and transmission.

This arrangement for a hydrodynamic coupling device ensures that a torque-type coupling or interaction between the hydrodynamic coupling device and the transmission ultimately takes place only for the purpose actually provided for by the coupling device. Namely, for transmission of a driving torque or for transmission of a braking torque. There are no other torque-type couplings or interaction areas directly between the coupling device and the transmission. It is no longer necessary to first form a subassembly of the coupling device and transmission. Rather, the coupling device can be added to the drive unit as a separate subassembly before the transmission. Then, the transmission can be added by itself to the coupling device which is already installed. The transmission can be coupled to the coupling device so that a driving torque or braking torque can be transmitted between the coupling device and the transmission.

It is possible for the hydrodynamic coupling device to include an impeller wheel and a turbine wheel as well as a work fluid in a work fluid space, which provides a fluid torque coupling between the impeller wheel and the turbine wheel. It is also possible, in the second coupling area, to form only a torque-transmitting coupling between the turbine wheel and an input area of the transmission.

In an embodiment of the present invention, the hydrodynamic coupling device can be constructed to include a work fluid pump arrangement for supplying work fluid to the work fluid space and for discharging work fluid from the work fluid space. In this case, the work fluid pump arrangement is couplable or is coupled in a torque-transmitting manner with a subassembly which moves during operation, preferably, the impeller wheel or a subassembly in torque transmitting connection with the impeller wheel. The work fluid pump arrangement is also couplable to or is coupled to the drive unit or a subassembly associated with the drive unit.

As a result of this construction, the work fluid pump arrangement is still driven by a component or subassembly of the coupling device itself. However, support of the work fluid pump arrangement against this driving torque is no longer effected relative to the transmission, but is formed for the drive unit or a subassembly associated with the drive unit. A "subassembly associated with the drive unit" is any subassembly which can ultimately form a fixed torque supporting unit with the drive unit without the need for the transmission to be provided or installed beforehand. Accordingly, in principle, a vehicle chassis or other component of the vehicle can be considered "a subassembly which is associated with the drive unit" in a torque-supporting manner. For example, after the drive unit is fitted to the chassis it can, in principle, permit such support without the need for the transmission to be mounted beforehand. In other words, the torque support takes place without the need for a torque flow to be carried out via the transmission or other component of the transmission. It is possible, for example, for the work fluid pump arrangement to be integrated in the drive unit and put into operation through a drive shaft of the drive unit.

In a further embodiment, the hydrodynamic coupling device of the present invention is constructed so that it comprises a stator wheel which is rotatable on a supporting arrangement in a first rotating direction and is supported so as to be blocked against rotation in a second rotating direction opposed to the first rotating direction. The supporting arrangement can be couplable or coupled in a torque-transmitting manner to the drive unit or a subassembly associated with the drive unit. As previously discussed "a subassembly associated with the drive unit" may be included in the device.

It is also advantageous for the work fluid pump arrangement to be couplable or coupled via the supporting arrangement in a torque-transmitting manner to the drive unit or to the subassembly associated with the drive unit.

According to a further embodiment of the present invention, a hydrodynamic coupling device, especially a hydrodynamic torque converter, for transmitting/converting a driving/braking torque between a drive unit and a transmission, includes an impeller wheel, a turbine wheel, a stator wheel and/or a supporting arrangement and a work fluid pump arrangement. The impeller wheel is torque transmission connectable or is in torque transmission connection with the drive unit. The turbine wheel is torque transmission connectable or is in torque transmission connection with the transmission. The stator wheel is rotatable on a supporting arrangement in a first rotating direction and is supported so as to be blocked against rotation in a second rotating direction opposed to the first rotating direction. Optionally, a work fluid pump arrangement by which a work fluid can be supplied to a work fluid space and discharged from a work fluid space is provided. The work fluid pump arrangement is couplable or is coupled in a first pump area in a torque-transmitting manner to the impeller wheel or a component rotating therewith, and is couplable or is coupled in a second pump area in a torque-transmitting manner to a subassembly which essentially does not move with the impeller wheel during operation.

In a further embodiment of the present invention the supporting arrangement and/or the second pump area is coupled in a torque-transmitting manner to the drive unit or to a subassembly associated with the drive unit.

In this way, an at least partial decoupling of the hydrodynamic coupling device from the transmission by way of subassembly can be achieved, to facilitate the assembly of a whole system.

It is also possible that the torque transmission coupling of the work fluid pump arrangement and/or the supporting arrangement to the drive unit or to the subassembly associated therewith can be made before the torque transmission connection of the hydrodynamic coupling device with the transmission is made.

Preferably, torque transmission coupling of the work fluid pump arrangement and/or the supporting arrangement to the drive unit is done before the transmission is integrated into the drive system.

In a still further embodiment of the present invention, a hydrodynamic coupling device such as that generally described above can be constructed so that the supporting arrangement has a first supporting element and a second supporting element. The first supporting element is fixedly couplable or is fixedly coupled to the drive unit or subassembly associated therewith. The second supporting element is connected to or is integral with the first supporting element and supports the stator wheel. The second supporting element forms or has a part of the work fluid pump arrangement.

The stator wheel support can be part of the coupling device. Integration of the work fluid pump arrangement in the area of the stator wheel support is achieved by a subassembly. This results in two particularly advantageous effects. First, the work fluid pump arrangement subassembly is fully integrated in the coupling device itself, so that the coupling device itself can form a functional unit. Second, support of this work fluid pump arrangement with respect to torque is carried out by means of the same supporting arrangement which also provides support of the stator wheel. This leads to an appreciably simplified design.

In a further embodiment of the present invention, a pump space is formed at the second supporting element, a first pumping area and, optionally, a second pumping area is provided in this pump space, wherein at least the first pumping area can be driven to movement by the impeller wheel in order to discharge work fluid from the work fluid space or to supply work fluid to the work fluid space.

It is advantageous for a fluid channel arrangement to be provided in the second supporting element, wherein the work fluid can flow toward and away from the pump space through this fluid channel arrangement.

When the turbine wheel and an area of a housing of the hydrodynamic coupling device connected with the impeller wheel are held by the supporting arrangement relative to the drive unit in an axial direction with respect to an axis of rotation of a drive shaft of the drive unit and the area of the housing is preferably pressed against the drive shaft, the supporting arrangement can assume a further function, namely, to hold various components axially.

For this purpose, a first driver arrangement is provided in the area of the housing. When the supporting arrangement is coupled to the drive unit or to the subassembly associated therewith, the first driver arrangement is held in a torque-transmitting positive engagement with a second driver arrangement which is rotatable with the drive shaft. These two driver arrangements then necessarily remain engaged by the axial support of different subassemblies of the coupling device. This axial support is necessarily supplied by the supporting arrangement. It is therefore impossible for these two driver arrangements to disengage from one another axially.

It is possible for the supporting arrangement to perform another function as it forms at least a part of a housing of the hydrodynamic coupling device comprising the work fluid space.

In a further embodiment of the present invention the turbine wheel is in torque transmission connection with a driven member. Preferably, the driven member is a driven shaft of the hydrodynamic coupling device. The driven member can be brought into torque transmission connection with a transmission input member for producing the torque transmission connection between the drive unit and the transmission. Preferably, the transmission input member is a transmission input shaft. In order to be able to achieve vibration damping in the coupling device itself in case of torsional vibrations, it is suggested that the turbine wheel be in torque transmission connection with the driven member by means of a torsional vibration damping arrangement.

Further, the coupling device can have a lockup clutch arrangement by means of which a torque transmission connection can be produced between a drive shaft of the drive unit and the driven member. This at least partially locks the operating mechanism comprising impeller wheel and turbine wheel. Preferably, a torsional vibration damper arrangement is operatively incorporated into the coupling device.

The present invention further relates to a drive system comprising a drive unit, a transmission and a hydrodynamic coupling device according to the invention. The present invention also relates to a process for assembling a drive system having a drive unit, a transmission and a hydrodynamic coupling device according to the invention. The process includes the following steps:

a) joining the drive unit and hydrodynamic coupling device to form a constructional unit, b) and then joining the constructional unit to the transmission.

Preferably, step a) includes producing a torque transmission connection between a drive shaft of the drive unit and a first coupling area of the hydrodynamic coupling device while producing a torque transmission coupling between at least one of a supporting arrangement supporting a stator wheel of the hydrodynamic coupling device and a first pump area of a work fluid pump arrangement of the hydrodynamic coupling device; and the drive unit or a subassembly associated therewith.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The present invention is described in detail below with reference to the accompanying drawings in schematic form as follows.

DETAILED DESCRIPTION OF THE PRESENTLY PREFERRED EMBODIMENTS

Figure 1:
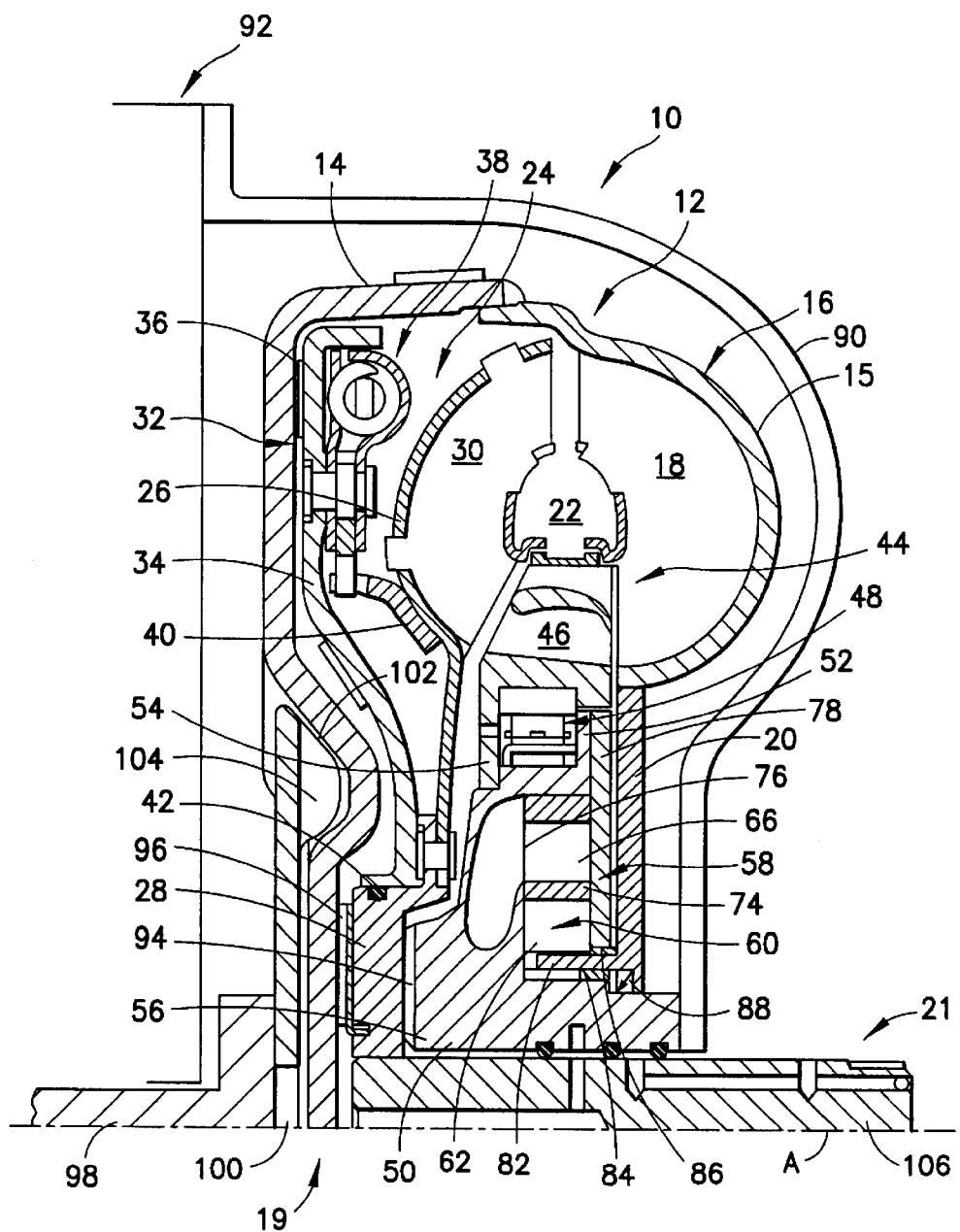
FIG. 1 is a partial longitudinal section view of a hydrodynamic coupling device according to the invention.

A first construction type of a hydrodynamic coupling device according to the invention is described with reference to FIGS. 1 to 3.

The hydrodynamic coupling device 10 is constructed as a torque converter in the present case. This torque converter 10 has, in a manner known per se, a converter housing 12 which comprises a housing cover 14 and an impeller wheel shell 15 of an impeller wheel 16, this impeller wheel shell 15 being fixedly connected with the housing cover 14 on the radial outside, e.g., by welding. In its radial outer area, the impeller wheel shell 15 carries a plurality of impeller wheel vanes 18 which are arranged successively in the circumferential direction and is connected on the radial inner side with an impeller wheel hub 20. A turbine wheel 24 which, in turn, has a turbine wheel shell 26 and a turbine wheel hub 28 fixedly connected with the latter is arranged in the interior 22 of the torque converter 12. The turbine wheel shell 26 carries turbine wheel vanes 30 which are positioned successively in the circumferential direction.

The torque converter 10 further has a lockup clutch 32 with a clutch piston 34 having friction linings 36 on the radial outside and can be selectively pressed against the housing cover 14 by changing the oil pressure in the interior 22 of the torque converter 12, as will be described in the following. In this way a connection between the housing 12 and the turbine wheel 24 is produced so that they are fixed with respect to rotation relative to one another. The piston 34 is fixedly connected with an input side of a torsional vibration damper, designated generally by 38, whose output side engages in a positive locking manner with a driver element 40 in the circumferential direction, for example, by means of toothed arrangements. The element 40 is welded to the turbine wheel shell 26 so that when the lockup clutch 32 engages the torque is transmitted directly from the housing 12 via the torsional vibration damper 38 to the turbine wheel hub 28. It is noted that the torsional vibration damper can be constructed in a conventional manner, i.e., it can have two cover disk elements which are connected with one another axially so as to be fixed with respect to rotation relative to one another, with a central disk element or hub disk element of the output side being arranged therebetween. The cover disk elements and the hub disk element are supported against one another with the intermediary of damper springs extending substantially in the circumferential direction. As a result, the cover disk elements and the hub disk element can be moved relative to one another accompanied by the compression of these springs when a torque is introduced. During this relative movement, to enable a corresponding relative movement between the turbine wheel 24 and the clutch piston 34 (which is now fixed with respect to rotation relative to the housing 12), the clutch piston 34 is held on the turbine wheel hub 28 with the intermediary of a sealing element 42 so as to be rotatable and axially displaceable. In principle, any other construction of a torsional vibration damper is also possible, e.g., one with a plurality of nested hub elements.

A stator wheel, designated generally by 44, is located between the turbine wheel 24 and the impeller wheel 16 in the axial direction. The stator wheel 44 comprises a plurality of stator wheel vanes 46 arranged successively in the circumferential direction. The stator wheel 44 is supported on a supporting element 50 via a freewheel, designated generally by 48, in such a way that the stator wheel 44 is rotatable with respect to the supporting element 50 in a rotating direction about the axis of rotation A of the converter, but is prevented from moving in the other rotating direction. It is noted that an axial supporting of the stator wheel 44 at the supporting element 50 can be achieved via a radial flange 52 of the supporting element 50 on one side and, in the other axial direction, via a retaining ring (not shown) which engages at a radial flange 54 of the stator wheel 44.

The supporting element 50 simultaneously forms a pump housing 56 of a work fluid pump, designated generally by 58. A pump space 60 is formed in the pump housing 56, i.e., in the supporting element 50; a first conveying wheel 62 is arranged in this pump space 60 concentric to the axis of rotation A, i.e., so as to be rotatable about this axis of rotation A. As is shown in particular in FIG. 3, this first conveying wheel 62 has teeth 64 facing radially outward. Further, a second conveying wheel 68 with teeth 70 facing radially inward which surrounds the first conveying wheel 62 and meshes with the latter in a circumferential area 66 is provided in the pump space 60 which is constructed in a round shape and is situated eccentric to the axis of rotation A. Through rotation of the first conveying wheel 62, the second conveying wheel 68 is likewise set in rotation, but about an axis of rotation that is offset with respect to axis of rotation A. A crescent-shaped separating element 74 is arranged in the circumferential area 72 which is located opposite the circumferential area 66 and in which the teeth 64 and 70 of the two conveying wheels 62 and 68 do not mesh with each other due to the existing eccentricity. The separating element 74 extends from a base area 76 of the pump space 60 to a cover element 78 which closes the pump space 60 toward the other axial side.

Figure 3:
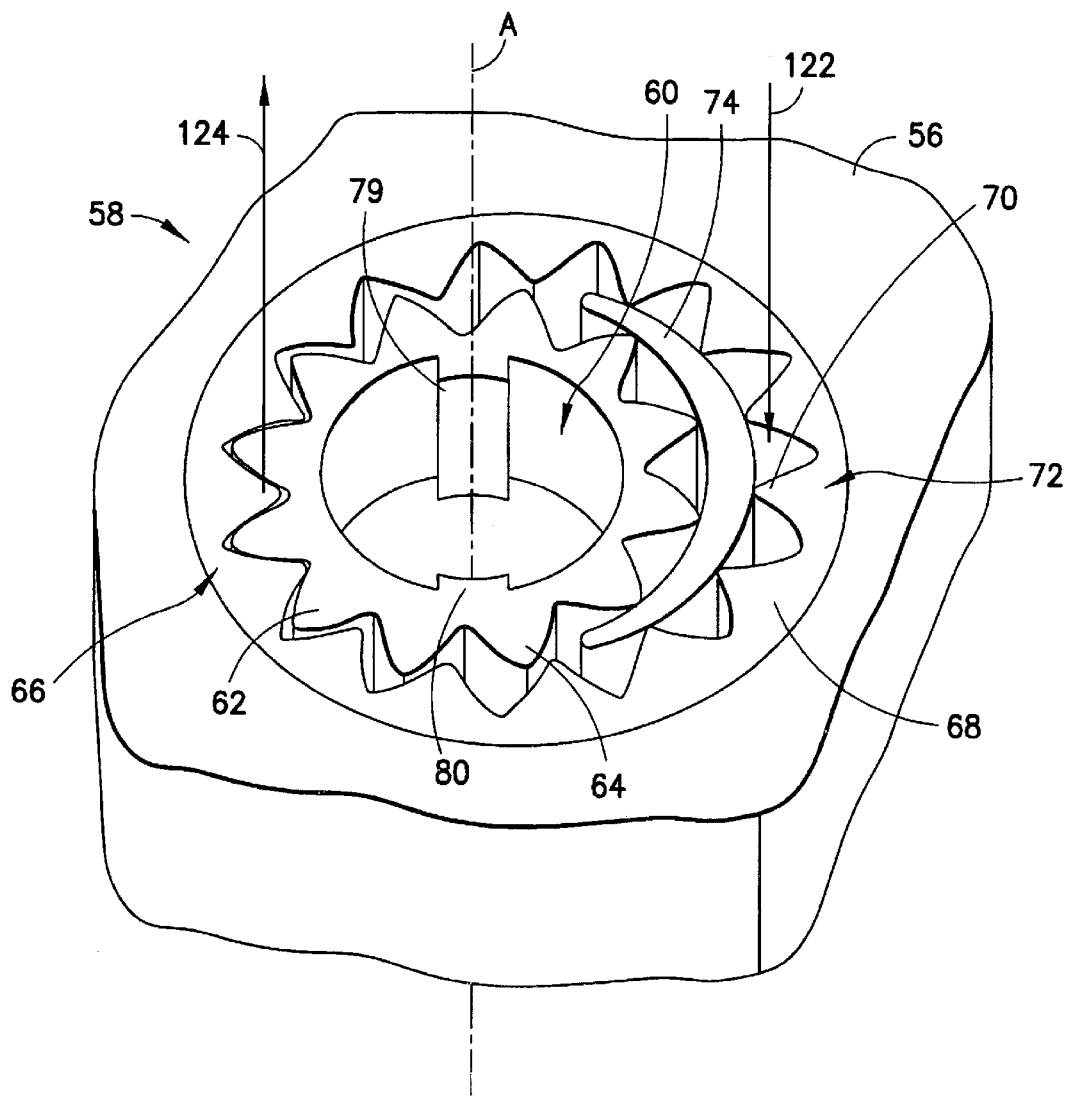
FIG. 3 is a perspective view of the work fluid pump arrangement used in the coupling device shown in FIGS. 1 and 2.

It will be seen in FIG. 3 that the first conveying wheel 62 has, at its inner circumferential area, a plurality of drive projections 79, 80 which project radially inward. These driver projections 79, 80 are in positive engagement with corresponding driver projections 82 of the impeller wheel hub 20 in the circumferential direction. As will be seen in FIG. 1, the impeller wheel hub 20 is sealed in a fluid-tight manner in the area of its driver projections 82 with respect to the pump housing 56 as well as with respect to the cover element 78 with the intermediary of respective sealing elements 84, 86. Further, the impeller wheel hub 20 is mounted on the pump housing 56, i.e., the supporting element 50, via a bearing arrangement 88 so as to be rotatable.

The supporting element 50, i.e., the pump housing 56, is held by another supporting element 90 at the drive unit 92 (shown only schematically) or with respect to a component which is fixedly connected with this drive unit 92. The supporting element is constructed in a bell-shaped manner and surrounds the entire torque converter 10 or, for example, is formed from one or more supporting struts. In the present case, "held at the drive unit 92" means, for example, mounted at the engine block. However, in principle, any other component which is fixedly connected with the engine block or drive unit 92 can also be used for holding the supporting element 50. This provides for axial support or holding of the supporting element 50 and, therefore, also of the stator wheel 44. Further, the turbine wheel 24 is axially supported at the supporting element 50 via an axial bearing area 94. The turbine wheel 24 is additionally supported at the housing cover 14 via another axial bearing area 96 formed, for example, by a separate bearing element. Therefore, the entire torque converter 10 is held axially with respect to the drive unit 92, and accordingly also axially with respect to a drive shaft 98 of the drive unit 92 by the supporting element 90.

A driver element 100 can be fixed to the drive shaft 98, for example, by screws or the like. Both driver element 100 and housing cover 14 can have respective shaped areas 102, 104 in their radially corresponding areas which engage one inside the other in a positive engagement in the circumferential direction in the manner of teeth. When the supporting element 90 is fixed to the drive unit 92 the entire torque converter 10 is fixedly positioned axially with respect to the drive unit 92. As a result, the torque converter 10 is also axially fixed with respect to the driver element 100. The turbine wheel hub 28 and axial bearing area 96 of the housing cover 14 are pressed toward the drive shaft 98 and driver element 100, respectively, via the pump housing 56 and the axial bearing area 94. As a result, a torque transmission coupling is necessarily produced between the drive shaft 98 and the housing 12 of the converter. A damping coating can be provided between the housing cover 14 and the driver element 100 or some other damping element can be arranged so as to enable torque transmission operation without rattling or wear.

It is noted that a driven member 106 constructed as a shaft stub is connected with the turbine wheel hub 28, for example, by laser welding or other welding. This shaft stub 106 penetrates a central opening in the supporting element 50 and is sealed to be fluid tight with respect to the support element 50 as will be described more fully in the following. Further, the shaft stub 106 penetrates the supporting element 90 and accordingly projects forward for torque transmission coupling with a transmission input shaft.

In this embodiment of the present invention there are two coupling areas. A first coupling area 19 is where the hydrodynamic coupling device, namely, the torque converter 10, is coupled to the drive unit 92 with respect to torque. A second coupling area 21 is where the hydrodynamic coupling device is coupled to a transmission with respect to torque. In the second coupling area, namely, that which essentially comprises the turbine wheel 24 and the driven shaft 106, a torque connection takes place only for the transmission of the driving torque or braking torque. In the first coupling area 19, a torque connection takes place toward the drive unit 92 for introducing a driving torque from the drive shaft 98 to the coupling device as well as for supporting the stator wheel 44 and the work fluid pump 58 via the supporting element 90 with respect to torque.

Figure 2:
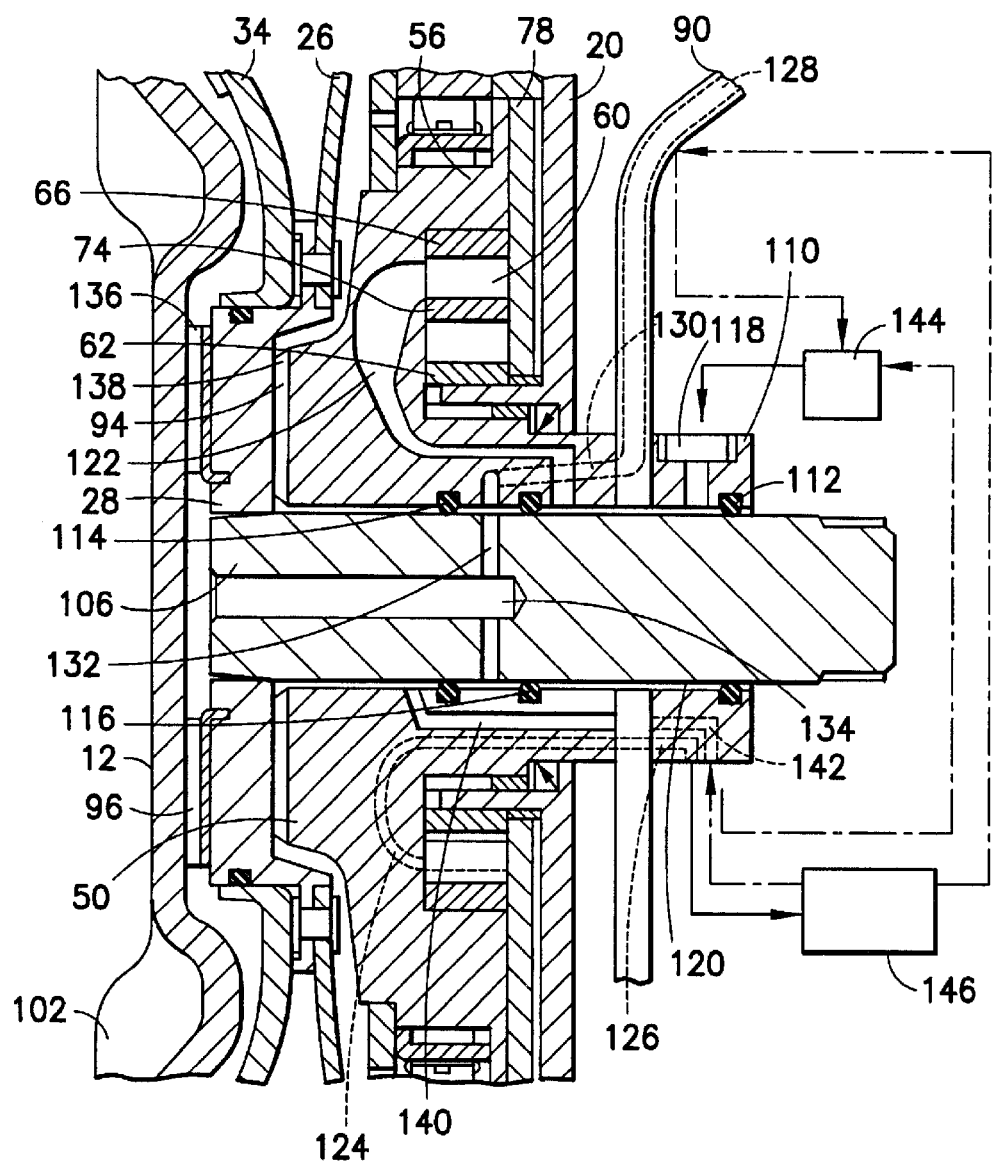
FIG. 2 is a partial longitudinal section view corresponding to FIG. 1 illustrating the fluid flow during supply and discharge of the work fluid.

FIG. 2 shows the arrangement in FIG. 1 and illustrates in particular the fluid flow characteristic and the channel arrangement for providing or building a fluid flow. It is assumed for the present instance that an annular fluid line element 110 is further provided in the embodiment shown in FIG. 2. This annular fluid line element 110 axially follows the area of the connection of the supporting element 90 with the supporting element 50 and is connected with these subassemblies by screws or the like. The ring element 110 is sealed relative to the shaft stub 106 by an O-seal 112. The supporting element 50, i.e., the pump housing 56, is likewise sealed relative to the shaft stub 106 by two O-shaped sealing elements 114, 116.

A first fluid channel leads through a through-opening 118 in the ring element 110 to an intermediate space 120 formed radially between the shaft stub 106 and the ring element 110 or pump housing 56 into an area between the seals 112, 116. Also flowing into this annular space 120 is a fluid channel 122 which is formed in the pump housing 56 and pump space 60, as indicated in FIG. 3, and opens into the circumferential area 72 radially inside and/or radially outside the separating element 74. At the oppositely located circumferential area 66, a fluid channel 124 proceeds from the pump space 60, penetrates the pump housing 90 and supporting element 56 and opens into an associated channel 126 in the ring element 110 and flows outward.

Referring again to FIG. 2, another fluid channel 128 indicated in dashed lines, may be formed in the supporting element 90. For example, separate channel elements may be provided wherein the supporting element 90 is formed of a plurality of tubular, radially extending elements or the like. The fluid channel 128 opens into a channel 130 in the pump housing 56 which, again, opens into the radial intermediate space 120 between the two sealing elements 114, 116. Located in this area are radial bore holes 132 of the shaft stub 106 which lead further to an axial bore hole 134. The axial bore hole 134 is open at an axial end of the shaft stub 106 located near the housing cover 12. A plurality of radial passage areas 136 through which fluid can flow are formed in the axial bearing arrangement 96. In a corresponding manner, a plurality of radial passage areas 138 which open radially inward and are accordingly open toward the radial intermediate space 120 are formed in the axial bearing arrangement 94. Another channel 140 which is formed in the pump housing 56 opens into this area of the radial intermediate space 120 at the left of the sealing element 114, that is, in that area of the radial intermediate space 120 located near the housing cover 14, and leads to an associated channel 142 in the annular element 110, this channel 142 again opening toward the outside.

When the work fluid pump 58 is in operation, which will be described in the following, fluid coming from a work fluid reservoir 144, for example, is introduced into the opening 118 and flows into the space 120. The fluid can then move in an axial direction along the shaft stub 106 and, before reaching the sealing element 116, flow into the fluid channel 122. The converter work fluid enters the pump space 60 via the fluid channel 122 and is then moved to the channel or the line 124 under pressure by means of pump action. The converter work fluid, which is now under pressure, flows out of the converter again via this channel 124 and the associated channel 126 and arrives at a control device which is designated generally by 146. This control device serves, first of all, to regulate the pressure of the fluid to a desired value and to feed the work fluid in suitable direction to the converter depending on whether the lockup clutch 32 is to be engaged or disengaged. If the lockup clutch 32 should not be engaged, i.e., if the clutch piston 34 is to be moved axially away from the housing cover 14, the converter work fluid is introduced into channel 128 by the control device 146, as indicated by the dash-dot line in FIG. 2. The converter work fluid flows from channel 128 via annular space 120 and bore holes or openings 132 into the axial bore hole or opening 134 and then flows into the space formed between the clutch piston 34 and housing cover 12 via the radial openings 136 in the axial bearing arrangement 96. As a result, the pressure in this space is increased so that the piston 34 moves away from the housing cover 12 axially and the friction lining 36 disengages from the housing cover 12. The converter work fluid which is under pressure then flows through between the housing cover 12 and the friction lining 36 and thus reaches the interior space 22 of the converter. The work fluid is guided out of this interior space 22 inward to the annular space 120 via the intermediate space formed between the turbine wheel 24 and supporting element 50 or pump housing 56 and the radial openings 138 in the axial bearing arrangement 94. The work fluid then flows outward again to the reservoir 144 via channel 140 and channel 142. If the lockup clutch 32 is to be put into the engaged state, i.e., if the pressure in the interior space 22 is to be increased in order to press the piston clutch 34 axially against the housing cover 12, an opposite flow is built up by the control device 146 as is indicated by the dashed line with arrow in FIG. 2. The fluid then flows in the opposite direction to that described above so that the pressure in the interior space 22 predominates and the piston 34 is pressed with its friction lining 36 against the housing cover 12. If lining grooves or the like are provided in the friction lining 36, for example, then the fluid can also reach the reservoir 144 in this flow direction, i.e., a fluid transfer can also take place with this flow. It is therefore desirable to provide fluid cooling means to the reservoir 144 to cool this fluid before it returns to the converter via opening 118.

The work fluid pump 58 which can be seen particularly in FIG. 3 functions in the following manner. During rotary operation, as the drive shaft 98 rotates, the converter housing 12 is likewise set in rotation so that the first conveying wheel 62 is driven in rotation via the impeller wheel hub 20. The conveying wheel 68 which meshes in some areas with the conveying wheel 62 is also set in rotation by the rotating conveying wheel 62. The work fluid introduced into the area of the separating element 74 is carried along by the teeth 64, 70 moving in the circumferential direction and is increasingly compressed between these teeth as it moves toward the circumferential area 66. It then enters the channel 124 under pressure and is conveyed farther in this manner. After the work fluid passes through the circumferential area 66, the teeth 64, 70 move apart again so that a vacuum is built up again in this location. This helps to conduct the work fluid further into the circumferential area 66. The support of the reaction torque of this work fluid pump 58, referred to generally as a crescent pump, is carried out via the pump housing 56, i.e., the supporting element 50, and the supporting element 90 to the drive unit 92. Accordingly, the work fluid pump 58 receiving the driving torque from the impeller wheel 16 is not supported relative to the transmission with respect to torque. Further, the reaction torque of the stator wheel 44 is also supported toward the drive unit 92 via the pump housing 56, supporting element 50, and supporting element 90. There is no support with respect to torque toward the transmission in this case either. The only coupling with respect to torque between the converter 10 and the transmission is effected only in the area of the shaft stub 106 which can be engaged, for example, in the manner of teeth, with the transmission input shaft 176 or with another driving member of the transmission. Accordingly, in this case the torque converter 10 can form a unit with the drive unit 92 with respect to function or in terms of a subassembly. For example, the torque converter 10 can be combined with the drive unit 92 before the transmission is integrated into the drive system. This appreciably facilitates construction. Accordingly, in the embodiment shown the converter 10, which is already completely assembled beforehand, need only be fitted axially to the drive unit 92 so that the two shaped arrangements 102, 104 engage. Once it has been produced, the torque transmission engagement between the drive unit 92, i.e., its drive shaft 98, and the converter 10 is then maintained as was described above. The transmission can then be fitted axially and coupled to the shaft stub 106 for torque transmission. Since decoupling from the transmission, i.e., from the transmission oil circuit, can also be provided with respect to the fluid flow, no steps other than those described above are required for putting this system into operation. As a result, there is no need to connect fluid lines leading to the transmission. The integration of the work fluid pump 58 in the torque converter 10 itself, especially in the element 50 supporting the stator wheel 44, further results in a particularly simple construction in which no separate steps need to be carried out for supporting the stator wheel 44 and work fluid pump 58 with respect to torque.

It will be seen that an axial bearing can be omitted from the supporting element 50 and the impeller wheel 16 or impeller wheel hub 20 due to the axial support of the different components relative to one another. Further, it is noted that the torsional vibration damper 38 and the lockup clutch 32 can be constructed in a different manner than that explicitly described herein. For example, a coupling having a plurality of plates can also be used, and the torsional vibration damper can act, for example, between the coupling piston 34 and the turbine wheel hub 28 or between the turbine wheel hub 28 and the turbine wheel shell 26. It is also noted that the channel arrangement described in FIG. 2 for supplying and discharging the work fluid need not necessarily be provided in the interior of the converter 10. For this purpose, other arrangements can be provided to feed work fluid from the pump 58 to a control device and from the control device in a suitable direction back to the converter interior. In principle, it is also possible, as is shown in FIG. 1, to supply and discharge the fluid via corresponding fluid lines or bore holes in the shaft stub 106 in which case, for example, the shaft stub 106 is connected outside of its coupling with the transmission, with corresponding fluid supply lines and discharge lines. The fluid supply and discharge lines may also provide a fluid coupling to the transmission or to a control device provided therein. It is noted that the control device 146 can comprise, for example, a direction-switching valve with changeable throttle function so as to adjust the change in flow direction mentioned above as well as the intensity of the fluid flow. In principle, the converter can also be fixed to the drive shaft 98 by a screw which fits in the center of the housing cover 14 and is screwed into a corresponding bore hole in the drive shaft 98. For this purpose, a central opening can be provided in the shaft stub 106 through which a tool can be guided for tightening the screw. In this case, sealing is required in the area of the screw and a closure must subsequently be provided at the shaft stub. It should be noted, further, that the two sliding bearing arrangements 94, 96 mentioned above can, of course, also be constructed as rolling body bearings. It is also possible to use springing bearing elements to dampen axial movements.

Figure 4:
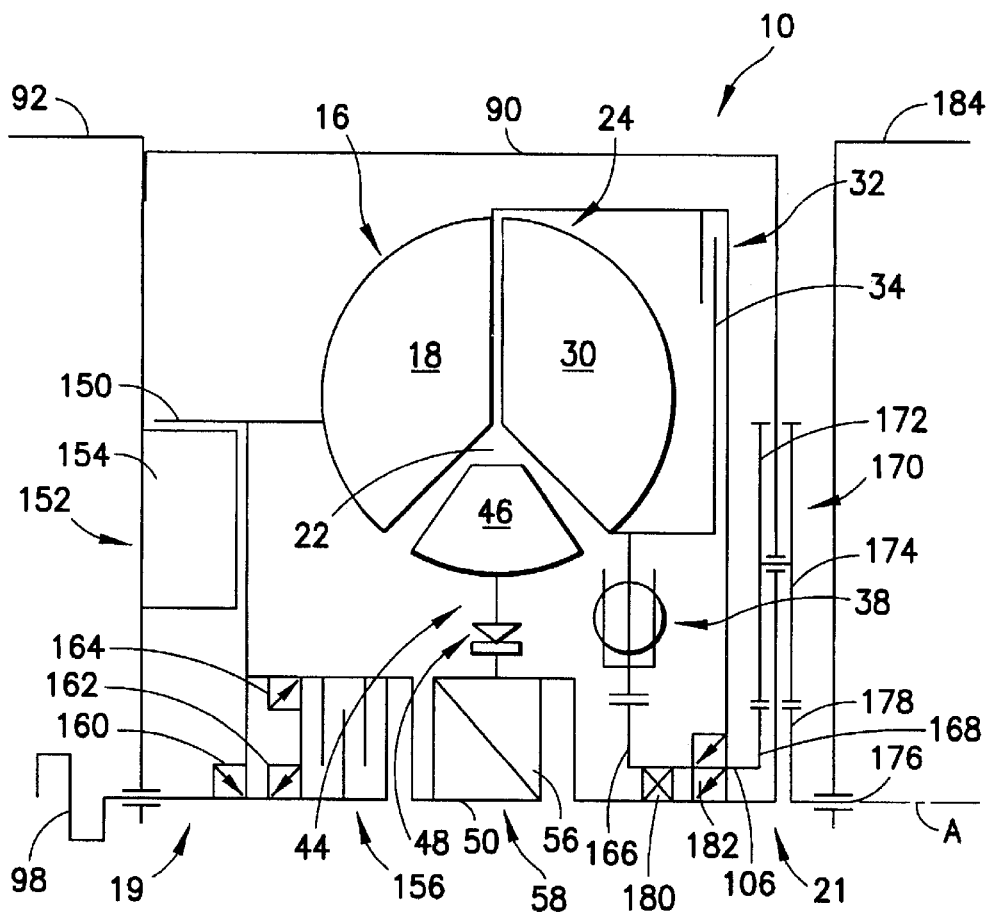
FIG. 4 is a an embodiment of the hydrodynamic coupling device according to the invention.

An additional embodiment of the present invention is shown in FIG. 4. In this case also, the stator wheel 44 is supported via the two supporting elements 50, 90 with respect to the drive unit 92, for example, an engine block. The freewheel 48 of the stator wheel 44 can again be supported at the supporting element 50 which also forms a pump housing 56. The movable part of the work fluid pump 58, for example, the toothed gears described above, are in driving connection with the impeller wheel 16 of the torque converter 10 and are also connected with an outer rotor 150 of a starter/generator arrangement which is designated generally by 152. The stator 154 of this starter/generator arrangement 152 may also be supported at the drive unit 92 or a component fixedly connected therewith. The impeller wheel 16, outer rotor 150 and movable part of the work fluid pump 58 which move jointly and comprise this subassembly can be selectively coupled to the drive shaft 98 so as to be fixed with respect to rotation relative to it by means of a selectively engagable coupling 156. In the present case, sealing elements 160, 162, 164 are provided at various components that move relative to one another. When the starter/generator arrangement 152 is supplied with sufficient current and the clutch 156 is engaged, the drive unit 92 can be started by the starter/generator arrangement 152. Further, this starter/generator arrangement 152 is constructed so as to generate current for the vehicle power supply during rotary operation of the drive unit 92. The starter/generator arrangement 152 may also either exclusively or additionally introduce a driving torque in the drivetrain.

The turbine wheel 24 is in a drive connection with the driven shaft 106 via the torsional vibration damper 38. Toothed wheels 166, 168 are provided at both ends of the driven shaft 106. Toothed wheel 166 meshes with an internal toothed wheel which is fixedly connected with the torsional vibration damper 38. Toothed wheel 168 meshes with a double toothed wheel 170 which is supported eccentrically at the supporting element 90 with respect to axis of rotation A. A first toothed wheel 172 of the double toothed wheel 170 located inside the bell-shaped supporting element 90 meshes with the toothed wheel 168 provided at the driven shaft 106 and a second toothed wheel 174 of the double toothed wheel 170 located outside the supporting element 90 meshes with a toothed wheel 178 provided at a transmission input shaft 176 of the transmission 184. Accordingly, the double toothed wheel 170, possibly in cooperation with the driven shaft 106, forms the driven member of the torque converter 10 in the second coupling area 21. Further, the turbine wheel 24 and impeller wheel 16 are coupled so as to be fixed with respect to rotation relative to one another via the lockup clutch 32. When the clutch 156 and lockup clutch 32 are engaged, a rigid torque transmission connection is made from the drive shaft 98 via the impeller wheel 16, lockup clutch 32, torsional vibration damper 38, driven shaft 106 and double toothed wheel 170 to the transmission input shaft 176.

The driven shaft 106 in this case is constructed as a hollow shaft and is mounted on the supporting element 90 via a bearing/seal arrangement 180, 182 so as to be rotatable, but sealed. The double toothed wheel 170 is supported at supporting element 90 to be rotatable, but sealed. The supporting element 190 which is constructed, for example, in a bell-shaped manner, forms a supporting housing enclos-
ing the entire torque converter. However, a fluid-tight work space is already formed by the impeller wheel 16 and the further housing area which serves to cooperate with the lockup clutch 32 or forms part of the latter.

It is noted that the supply and discharge of fluid to and from the interior space 22 can also be performed as described above with reference to FIGS. 1 to 3.

Figure 5:
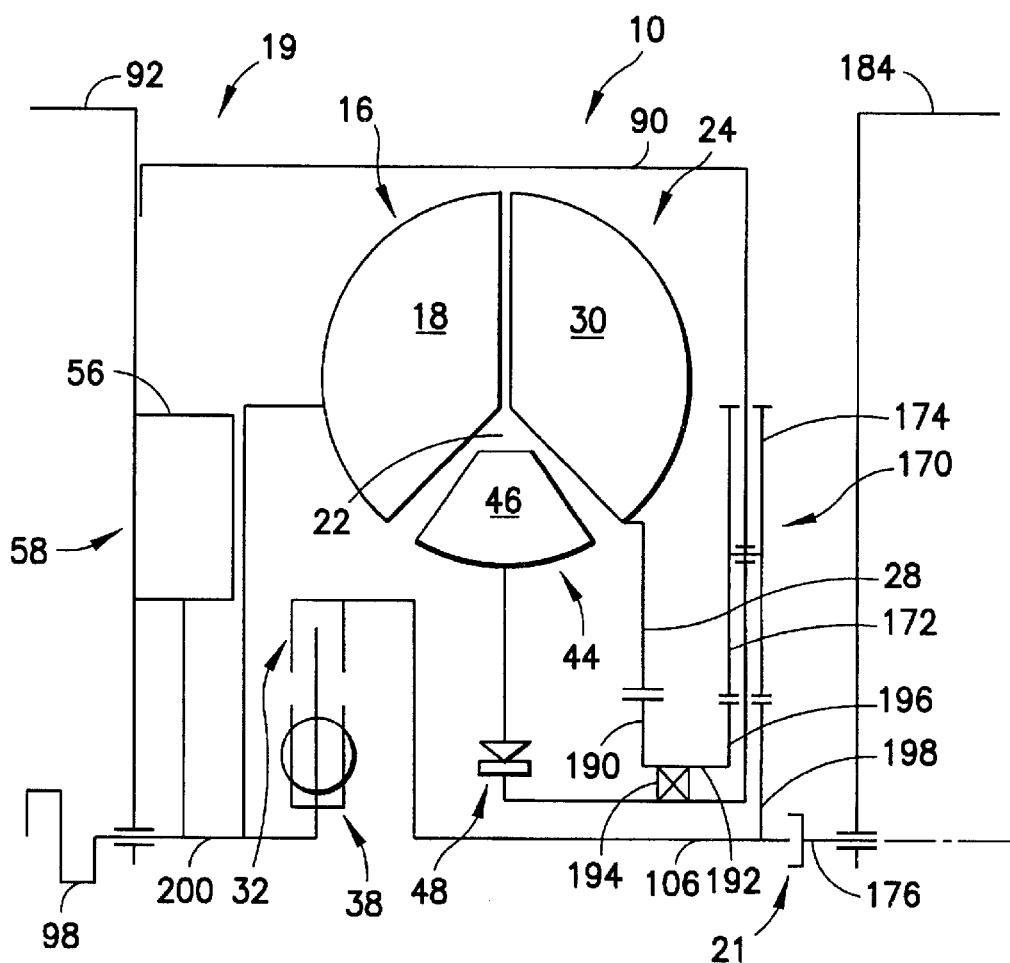
FIG. 5 is an alternative embodiment of the hydrodynamic coupling device according to the invention.

A further embodiment is shown in FIG. 5. Here, the work fluid pump 58 is secured to the drive unit 92 by its housing 56 and is therefore supported at that location with respect to torque. The moving parts of the work fluid pump 58 are driven directly by the drive shaft 98 or an input shaft 200 of the converter connected to the drive shaft 98. Further, the drive shaft 98 is in a drive connection with the impeller wheel 16 and, via a torsional vibration damper 38 and the lockup clutch 32, with the driven shaft 106. The freewheel 48 of the stator wheel 44 is supported, via the supporting element 90, at the drive unit 92 or a component associated with or connected with the drive unit 92. The turbine wheel 24, i.e., its hub 28, meshes by an internal toothing with teeth of a toothed wheel 190 arranged coaxial to the turbine wheel hub 28. Toothed wheel 190 is arranged at one end of an intermediate shaft 192. A toothed wheel 196 provided at the other end of the intermediate shaft 192 is rotatably supported on the supporting element 90 via a bearing arrangement 194 and meshes with the toothed wheel 172 of the double toothed wheel 170. The second toothed wheel 174 meshes with a toothed wheel 198 provided at the driven shaft 106. When the lockup clutch is not engaged, the torque is transmitted via the impeller wheel 16 and the turbine wheel 24, the intermediate shaft 192, the double toothed wheel 170 and the toothed wheel 198 at the driven shaft 106 to the transmission input shaft 176, which is in torque transmitting engagement with the driven shaft 106, for example, by means of teeth which can be inserted within one another axially. When the lockup clutch is engaged, the flow of torque proceeds directly from the drive shaft 98 to the torsional vibration damper 38, the lockup clutch 32 and accordingly to the driven shaft 106.

In this case the supporting element 90 forms a housing which encloses the work space of the torque converter 10 in a fluid-tight manner, so that no additional components need be provided. Nevertheless, it is also possible for a wall element to be arranged, for example, between the drive unit 92 and the transmission 184 so as to surround the entire converter 10. However, this connection would not be a torque transmitting connection within the meaning of the present invention. In the embodiments shown herein, a torque type coupling of the hydrodynamic coupling device 10 with the transmission 184 is performed only via the driven member, for example, the driven shaft 106, over which the driving or braking torque flows. Support of the stator wheel 44 and/or support of the work fluid pump 48 with respect to torque is performed toward the drive unit 92 or a component connected therewith, e.g., the vehicle chassis rather than toward the transmission 185. In this way, it is possible to first combine the coupling device 10 with the drive unit 92 to form a subassembly, to install this subassembly on a chassis and only then to add the transmission 184 which is only connected by its transmission input shaft 176 to the driven member 106 of the coupling device 10. This considerably simplifies the construction process.

Figure 6:
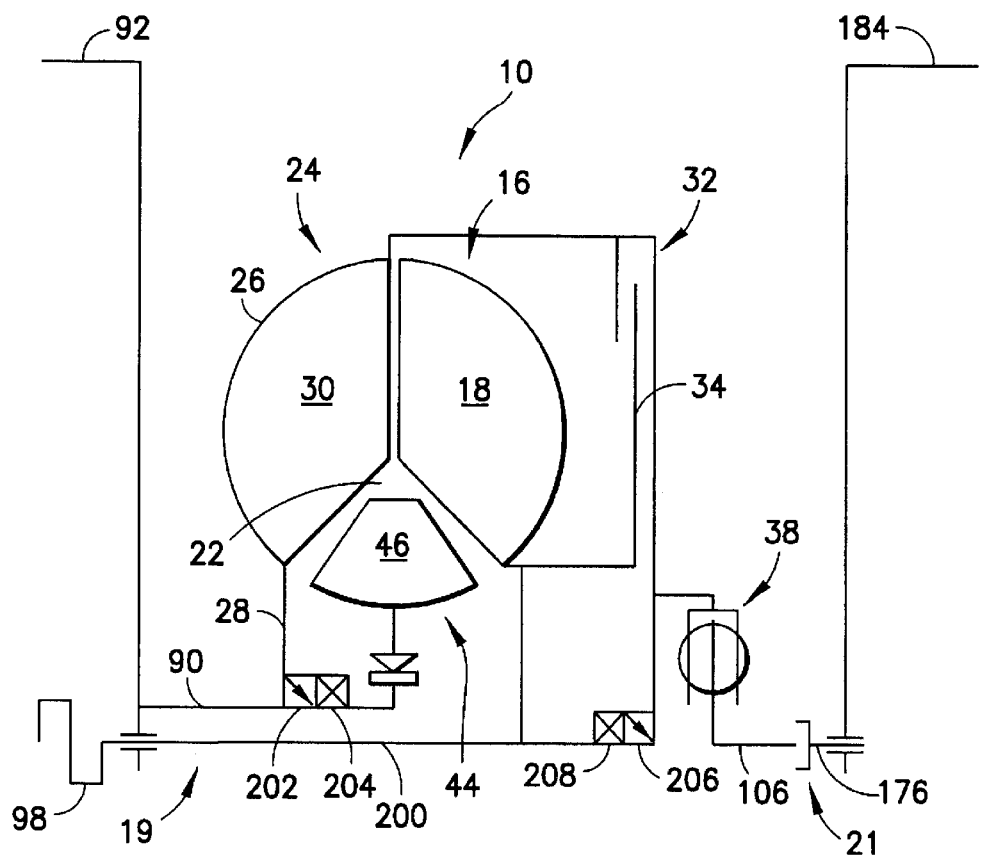
FIG. 6 is a further embodiment of the hydrodynamic coupling device according to the invention.

A further embodiment of the hydrodynamic coupling device according to the present invention is shown in FIG. 6. The impeller wheel 16 is again driven directly by the drive shaft 98; for example, it is supported on a shaft 200 that is coupled fixedly to the drive shaft 98. The supporting element 90, which can be a hollow shaft or the like is again supported with respect to torque at the housing 92 and supports the stator wheel 44. The turbine wheel 24 now forms a fluid-tight enclosure toward the outside with its turbine wheel shell 26, the turbine wheel hub 28 and the lockup clutch 32. For this purpose, the turbine wheel hub 28 is tightly mounted on the supporting member 90 via a seal/bearing arrangement 202, 204 and the lockup clutch 32 is mounted by its area connected with the turbine wheel 24 on the shaft 200 to be fluid tight via a seal/bearing arrangement 206, 208. The torsional vibration damper 38 is coupled to this part of the lockup clutch 32 and is further coupled to the driven shaft 106 so as to be fixed with respect to rotation relative to it. In this case, the work fluid pump (not shown) is integrated in the drive unit 92 (i.e., is arranged therein) and is supported with respect to torque relative to the drive unit 92 and driven by the drive shaft 98. Work fluid can be introduced into the interior space 22 of the torque converter 10 or guided out of this area via fluid passages (not shown) which are located, for example, radially inside the supporting element 90 formed as a hollow shaft.

Figure 7:
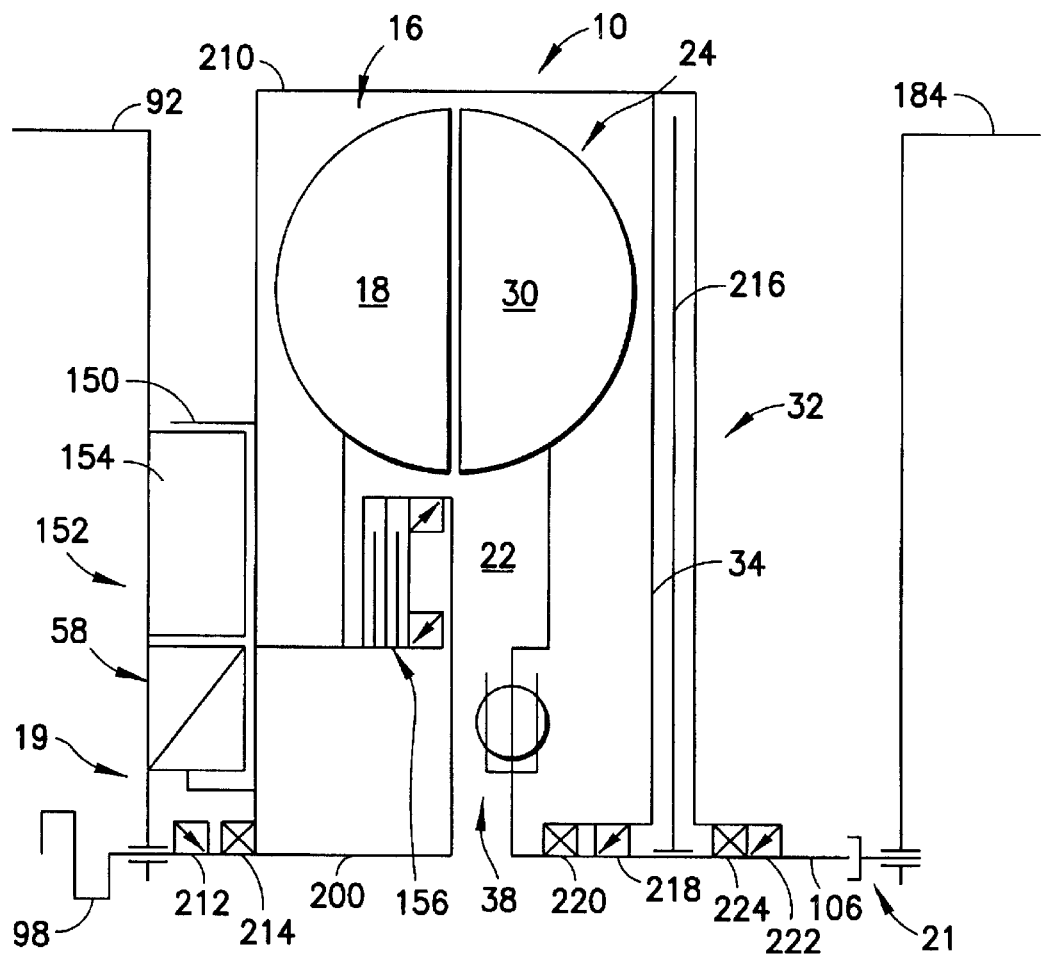
FIG. 7 is an other embodiment of the hydrodynamic coupling device according to the invention.

A further embodiment where the hydrodynamic coupling device is a fluid coupling (i.e. a coupling having only an impeller wheel 16 and a turbine wheel 24, but no stator wheel) is shown in FIG. 7.

In FIG. 7, the impeller wheel 16 comprises a housing part 210 which, on one side, is connected with the outer rotor 150 so as to be fixed with respect to rotation relative to it. On the other side the impeller wheel 16 is rotatably mounted via a seal/bearing arrangement 98 on the shaft 200 which is fixedly coupled to the drive shaft 212, 214. The shaft 200 can be coupled to this subassembly so as to be fixed with respect to rotation relative to it via a coupling 156. The turbine wheel 24 arranged inside the housing part 210 is in torque transmission connection with the driven shaft 106 via the torsional vibration damper 38. The lockup clutch 32 comprises a member 216 which is likewise connected with the driven shaft 106 so as to be fixed with respect to rotation relative to it. The lock up clutch 32 can be coupled to the housing part 210 by increasing the fluid pressure in the interior space 22 of the fluid coupling 10, for example, by axial displacement of a piston-like structural component part 34. This piston-like structural component part 34 and the housing part 210 are rotatably mounted on the driven shaft 106 via respective seal/bearing arrangements 218, 220 and 222, 224 but are sealed so as to be tight against fluid with respect to the driven shaft 106. When the coupling 156 is engaged, which can be achieved, for example, by increasing the fluid pressure, the drive shaft 98 is in torque transmission connection with the impeller wheel 16 and the starter/generator arrangement 152. The output torque can be conducted to the transmission input shaft 176 via the turbine wheel 24, the torsional vibration damper 38 and the driven shaft 106. When the lockup clutch 32 is engaged, the torque is transmitted directly from the housing part 210 and the coupling member 216 to the driven shaft 106.

Although no stator wheel, and accordingly also no stator wheel support, is provided in this embodiment of a hydrodynamic coupling device, the only torque type connection in the second coupling area 21 between the coupling device 10 and the transmission 184 is that over which the flow is effected to the driving/braking torque. The work fluid pump 58 is supported with respect to the drive unit 92 in the first coupling area 19.

It is noted once again that this decoupling from the transmission with respect to torque support, with the advantages already described, is achieved in all of the embodiments of the invention. In principle, it is also possible to prevent complete decoupling as described but rather, for example, to further support the stator wheel, as was previously known, toward the transmission. It is also possible, for example, to further integrate the work fluid pump in the transmission and to introduce the work fluid into the interior of the hydrodynamic coupling device via a corresponding channel in the driven shaft. It is also noted that a starter/generator arrangement which can deliver the starting torque as well as reinforcing torque and which can also supply electrical power to the onboard power supply can be provided in all of the embodiments shown. The starter/generator arrangement can also contribute to damping of torsional vibrations as in an eddy current brake.

The invention has been described with reference to embodiments in which a driven member of the hydrodynamic coupling device is brought into a direct connection with a transmission input shaft. However, a direct coupling of this kind need not be provided. For example, coupling of the driven member of the hydrodynamic coupling device with a transmission can also be achieved with the intermediary of other components such as intermediate shafts or the like. Further, it is noted that a transmission within the meaning of the present application is intended to include any arrangement suitable for transmitting a driving torque or braking torque between the hydrodynamic coupling device and driven wheels. Accordingly, within the meaning of the present invention, a transmission is to be understood to include any drivetrain system which can also contain, for example, a differential gear or distributor gear by means of which a driving torque is distributed to a plurality of driving wheels from a shaft driven by the driven member of the hydrodynamic coupling device. Accordingly, a transmission within the meaning of the present invention is any arrangement producing a driving connection between the hydrodynamic coupling device and the driving wheels.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A hydrodynamic coupling device for producing a torque transmission connection between a drive unit having a drive shaft and a transmission having an input area, the coupling device comprising:

first coupling means operatively attachable to the drive unit for transmitting torque;

second coupling means operatively attachable to the transmission for transmitting only a braking/driving torque between the drive unit and the transmission;

an impeller wheel;

a turbine wheel arranged relative to the impeller wheel to define a work fluid space;

a work fluid in the work fluid space, wherein the work fluid space receives the work fluid to form a liquid torque coupling between the impeller wheel and the turbine wheel, wherein the second coupling means is couplable with the turbine wheel and the input area for transmitting only torque between the turbine wheel and the input area;

a moveable subassembly in torque transmitting connection with the drive unit; and work fluid pump means for supplying the work fluid to the work fluid space and discharging the work fluid from the work fluid space, wherein the work fluid pump means is couplable to one of the drive unit and the movable subassembly.

2. The hydrodynamic coupling device according to claim 1, wherein the impeller wheel and the turbine wheel form an operating mechanism, and further comprising:

a lockup clutch operably arrangeable between the drive unit and the transmission so as to form a torque connection between a drive shaft of the drive unit and the driven member by a torque transmission connection which at least partially locks the operating mechanism.

3. The hydrodynamic coupling device according to claim 2, and further comprising a torsional vibration damper arrangement operably incorporated in the torque transmission connection.

4. The hydrodynamic coupling device according to claim 1, wherein the moveable subassembly comprises the impeller wheel.

5. The hydrodynamic coupling device according to claim 1, wherein the moveable subassembly comprises the impeller wheel and a further subassembly in torque transmission connection to the impeller wheel.

6. The hydrodynamic coupling device according to claim 1, wherein the work fluid pump means is integrateable to the drive unit so as to be operable through a drive shaft of the drive unit.

7. The hydrodynamic coupling device according to claim 1, further comprising:

a stator wheel; and means for supporting the stator wheel so that the stator wheel is rotatable in a first rotating direction and blocked from rotation in a second rotating direction opposed to the first rotating direction, the supporting means being connectable to the drive unit so as to transmit torque.

8. The hydrodynamic coupling device according to claim 7, wherein the work fluid pump means is couplable to the drive unit via the supporting means for transmitting torque and is couplable to the moveable subassembly for transmitting torque.

9. A hydrodynamic coupling device for transmitting a torque between a drive unit and a transmission, the hydrodynamic coupling device, comprising:

an impeller wheel connectable with the drive unit so as to transmit torque;

a turbine wheel connectable with the transmission so as to transmit torque, the turbine wheel and the impeller wheel defining a work fluid space;

a stator wheel;

at least one of supporting means and work fluid pump means;

the supporting means supporting the stator wheel so as to be rotatable in a first rotating direction and blocked against rotation in a second rotating direction opposed to the first rotating direction;

the work fluid pump means having a first pump area and a second pump area; and a work fluid for use with the work fluid pump means, wherein the work fluid pump means is capable of supplying the work fluid to the work fluid space and discharging the work fluid from the work fluid space, the first pump area being connectable with the impeller wheel so as to transmit torque, at least one of the supporting means and the second pump area being connectable with the drive unit so as to transmit torque.

10. The hydrodynamic coupling device according to claim 9, wherein at least one of the supporting means and the work fluid pump means is torque transmission connectable to the drive unit prior to the drive unit being in torque transmission connection with the transmission.

11. The hydrodynamic coupling device according to claim 10, wherein at least one of the supporting means and the work fluid pump means is torque transmission connectable to the drive unit prior to the transmission being integrated into a drive system.

12. The hydrodynamic coupling device according to claim 9, wherein the supporting means has a first supporting element and a second supporting element, the first supporting element being fixedly couplable to the drive unit and the second supporting element being one of connected to and integral with the first supporting element, wherein the second supporting element supports the stator wheel and forms at least a part of the working fluid pump means.

13. The hydrodynamic coupling device according to claim 12, wherein the second supporting element has a pump space including a first pumping area, wherein the first pumping area is driveable to movement by the impeller wheel for one of discharging work fluid from the work fluid space and supplying work fluid to the work fluid space.

14. The hydrodynamic coupling device according to claim 13, wherein the pump space has a second pumping area, wherein both the first pumping area and the second pumping area are driveable to movement by the impeller wheel for one of discharging work fluid from the work fluid space and supplying work fluid to the work fluid space.

15. The hydrodynamic coupling device according to claim 12, further comprising:

a fluid channel arrangement provided in the second supporting element so as to at least one of direct work fluid toward and direct work fluid away from the pump space.

16. The hydrodynamic coupling device according to claim 9, further comprising:

a housing having an area operatively connected to the impeller wheel, wherein the area of the housing and the turbine wheel are held by the supporting arrangement in an axial direction with respect to an axis of rotation (A) of at least one of a drive shaft of the drive unit or a component operatively connected to a drive shaft.

17. The hydrodynamic coupling device according to claim 16, wherein the area of the housing is pressed against one of the drive shaft of the drive unit and a component connectable to the drive shaft of the drive unit.

18. The hydrodynamic coupling device according to claim 16, further comprising:

a first driver arranged in the area of the housing;

a second driver arranged in the area of the housing, the second driver arrangement being rotatable with the drive shaft, wherein the first driver is held in torque transmitting positive engagement with the second driver arrangement when the supporting means is in torque connection with one of the drive unit and the drive shaft, the first driver and the second driver being configured to engage one another in a toothed manner.

19. The hydrodynamic coupling device according to claim 9, further comprising:

a housing, wherein the supporting means forms at least a part of the housing and at least partially defines the work fluid space.

20. A drive system, comprising:

a drive unit;

a transmission operably attached to the drive unit and comprising an input area; and a hydrodynamic coupling device having an impeller wheel connectable with the drive unit so as to transmit torque, a turbine wheel connectable with the transmission so as to transmit torque, the turbine wheel and the impeller wheel defining a work fluid space, a stator wheel, at least one of supporting means and work fluid pump means, the supporting means supporting the stator wheel so as to be rotatable in a first rotating direction and blocked against rotation in a second rotating direction opposed to the first rotating direction, the work fluid pump means having a first pump area and a second pump area and a work fluid for use with the work fluid pump means, wherein the work fluid pump means is capable of supplying the work fluid to the work fluid space and discharging the work fluid from the work fluid space, the first pump area being connectable with the impeller wheel so as to transmit torque, at least one of the supporting means and the second pump area being connectable with the drive unit so as to transmit torque.

21. A method of assembling a drive system having a drive unit, a transmission and a hydrodynamic coupling device having first coupling means operatively attachable to the drive unit for transmitting torque and second coupling means operatively attachable to the transmission for transmitting only a braking driving torque between the drive unit and the transmission, the method comprising the sequential steps of:

a) joining the drive unit and the hydrodynamic coupling device to form a constructional unit; and b) subsequently joining the constructional unit to the transmission.

22. A method of assembling a drive system having a drive unit, a transmission and a hydrodynamic coupling device having an impeller wheel connectable with the drive unit so as to transmit torque, a turbine wheel connectable with the transmission so as to transmit torque, the turbine wheel and the impeller wheel defining a work fluid space, a stator wheel, at least one of supporting means and work fluid pump means, the supporting means supporting the stator wheel so as to be rotatable in a first rotating direction and blocked against rotation in a second rotating direction opposed to the first rotating direction, the work fluid pump means having a first pump area and a second pump area and a work fluid for use with the work fluid pump means, wherein the work fluid pump means is capable of supplying the work fluid to the work fluid space and discharging the work fluid from the work fluid space, the first pump area being connectable with the impeller wheel so as to transmit torque, at least one of the supporting means and the second pump area being connectable with the drive unit so as to transmit torque, the method comprising the sequential steps of:

a) joining the drive unit and the hydrodynamic coupling device to form a constructional unit; and b) subsequently joining the constructional unit to the transmission.

23. The method according to claim 22, wherein the drive unit includes a drive shaft, and has a first coupling area defined by a torque connection between the coupling device and the drive unit, the method comprising additional steps being performed before step b), the additional steps being:

producing a torque transmission connection between the drive shaft of the drive unit and the first coupling area; and producing a torque transmission connection between at least one of the support element and the first pump area of the work fluid pump means and the drive unit.

* * * * *